July 20, 1937. F. H. HEDIN 2,087,667
COMPUTER
Filed Jan. 10, 1934 2 Sheets-Sheet 1

INVENTOR
Fred H. Hedin
BY
Cooper Kerr Dunham
ATTORNEYS

Fig. 5

Patented July 20, 1937

2,087,667

UNITED STATES PATENT OFFICE 2,087,667

COMPUTER

Fred H. Hedin, Willimantic, Conn., assignor, by mesne assignments, to The Pennsylvania Railroad Company, New York, N. Y., a corporation of Pennsylvania Application January 10, 1934, Serial No. 705,995

15 Claims. (Cl. 235—61)

This invention relates to computing apparatus including an electrical network by which different effects concerned with the equilibrium and condition of loaded structural members may be determined. A valuable application lies in its usefulness for designing suspended flexible members and, particularly, messenger wires for supporting overhead trolley wires which provide power for electrical railway operation. Because of this the invention will be explained with reference to certain problems arising in electrical railway work and the application of the invention for the solution of other problems will be self-evident from an understanding of the principles involved. In railway work the electrical overhead systems or trolley wires are supported from messenger wires by means of hangers which hang from the messenger wires at intervals between the points of suspension of the messenger wires. The distances between points of suspension and between hangers are variable, depending upon various factors entering into the particular system being designed.

In order to support a trolley wire at an approximately constant height above the tracks it is necessary to make elaborate computations for determining, for each span, the spacing and number of hangers, the various stresses and also the sag or deflection of the loaded messenger wire. The sag or deflection at any point is the vertical distance between the messenger wire and a straight line running between the messenger wire supports. Upon determining the sag at a hanger it is then a simple matter to determine the length of a particular hanger. The sag or deflection which a given wire will assume under a given load has a direct relation to the tension in the wire at its point of suspension, and hence to the horizontal and vertical reactions at the points of suspension. Accordingly, a loaded flexible element, such as a messenger wire, may be strung over two points of suspension and caused to have a desired sag by the application of such tension at the points of suspension of the wire as will result in giving the wire the sag or deflection desired. When a certain sag is desired for a given span the tension to be given the wire at its points of suspension must be determined. If a certain tension is desired for a given span it may be obtained by a determination of the deflections at different load points.

It has heretofore been the practice to determine the tension necessary to obtain a desired sag, or the sag which results from a given tension, by the application of principles of applied mechanics and extensive calculations. These calculations are tedious, laborious and because of this they are frequently subjected to error, and it is among the objects of this invention to obviate lengthy calculations and provide electrical circuits and measuring means by which the various effects desired may be obtained by measuring instruments.

It is a further object of the invention to enable the obtaining of values for different effects resulting from variously loading structural elements by a representation of the structural element and its loaded conditions in an energized network of circuits and by controlling and measuring the electrical results produced so as to obtain a direct reading of such effects as are proportional to the electrical conditions obtained in different parts of the network. The effects include force reactions at points of support, values of shear and of bending moment at different positions and, particularly for suspended flexible elements such as cords, cables, chains and the like, sag or deflection at any point and tension and loads required for producing any desired deflection.

Other applications and objects of the invention will appear hereinafter in the disclosure of the invention and in the claims which follow.

The network of circuits and arrangement of measuring instruments embodied in the present invention is particularly suited for solving two principal problems which occur in designing overhead systems for electrical railways, namely: first, determination of the sag of a messenger wire at different points of load for a given tension and span, and second, determining the tension necessary to be given a messenger wire at the points of suspension for a given span and sag. The first of these problems has a direct application in the hanging of messenger wires longitudinally of the track. A common practice is to assemble the messenger wire and trolley with hangers and to pull the same into place by applying the necessary tension to the messenger wire at the points of suspension. In order to do this the length of each hanger must be known and this is determined by computing the deflection of the messenger at each hanger. After the hangers have been constructed in suitable lengths they are fastened to the messenger wire and trolley wire, and for properly suspending the assemblage it is only necessary to pull upon the ends of the messenger wire until the desired tension has been attained. In railway parlance the suspended length of messenger wire with attached hangers and associated trolley wire extending between two points of suspension is called a "longitudinal catenary". Since the messenger wire and its supported trolley is over the track, a second flexible cord is required at each point of suspension of the messenger wire for supporting the longitudinal catenary between points of suspension at either side of the track. This latter flexible member, with associated appurtenances extends transverse the track and is known in electrical railway parlance as a "cross catenary". It is in the design and installation of the cross catenary that it is necessary to determine the requisite tension to be given the supporting flexible cord or cross catenary wire at its points of suspension in order to support a known load in a definite position over a known span.

While the principal use of the measuring apparatus will be discussed particularly with reference to the solution of these two problems, it is to be understood that the principle of the invention has many applications for the solution of different problems constantly arising in electrical railway construction, and that with the proper selection of constants and calibration of instruments it is possible to obtain other values and effects, such as shear, bending moments, span, tension, etc.

The apparatus illustrated in the drawings is provided with a uniform resistance element which corresponds with the length of span of the supporting wire or other structural element, a number of ammeters, which are calibrated to read in pounds the loads applied to the structural element and the vertical reactions at the points of suspension of the structural element, a voltmeter, calibrated in feet for enabling a reading of the sag or deflection of the structural element, and a rheostat or potentiometer, calibrated in pounds for giving a direct reading of the tension of the structural element.

The design of the measuring apparatus is founded upon the theory that if a uniform resistance element be arranged so that the two ends are of the same polarity (tied together electrically), and if, by means of a suitable source of electrical power, and suitable sliders or contacts, current is introduced into the resistance element at various points and returned through both ends, the current furnished to the resistance element through any given slider will divide so that the current in the resistance element to the left of the slider will be proportionate to the current in the resistance element to the right of the slider inversely as the distances from the slider to each end of the resistance element. Accordingly, if the resistance element represents the length of a loaded member and various sliders are positioned at points of application of various loads, and the currents introduced by the various sliders are proportionate to those loads, the current at any point in the resistance element will be proportionate to the shear at the corresponding point in the loaded member. Therefore, the current leaving each end of the resistance element will be proportional to the vertical component of the reaction at the corresponding end of the loaded member.

The foregoing is true irrespective of the number of load-representing currents and of the direction of the currents, that is, irrespective of the number of loads and whether the loads are applied in opposite directions. This will be determined and proved hereinafter.

Also, in the case of a suspended flexible member, if a suitable voltmeter be connected to read the voltage drop between either end of the resistance tube and a point on the tube after the tube has been "loaded" by the flow of current through the various load sliders in proportion and corresponding to the amount of load at each load point, the voltage drop will be proportional to the deflection or sag of the loaded member at the selected point on the member where the voltage tap is made. The voltage drop is also proportional to the bending moment at that point.

Operation

With the assistance of the circuit illustrated in Fig. 1, a description of the manual operation of the apparatus will be given so that the principle of the invention may be more easily understood. In this apparatus, resistance element B is a divider bar or rod having uniform resistance. The length of the divider bar, except for an allowance which will be mentioned hereinafter, represents the distance spanned by the messenger wire whose deflection and tension are to be computed. Below the divider bar B there is a scale 9 with markings thereon indicating percentage of length and this scale is used to locate any point in the span. Should it be desirable to design the apparatus for use only in obtaining effects of loading for a definite span, the scale could be graduated in units of linear measure. 10, 11, 12 and 28 are load sliders which may be positioned anywhere along the bar. There may be any number of load sliders, depending upon the number of hangers or concentrated loads which are supported by the messenger wire or other structural element. For the purpose of illustrating the principle of the invention, I have illustrated four of these load sliders, each being adapted to be connected by an electrical path or line to point X, a point in the network which is equidistant electrically from each end of the divider bar B. Load sliders 10, 11, 12 and 28 are connected to point X by load lines 13, 14, 15 and 29, respectively. Each of these lines include a load-regulating rheostat 16, a double-pole double-throw polarity reversing switch 17, a source of electrical energy 18, a load-ammeter-compensating resistor 19, a single-pole double throw key switch 20 and a current limiting resistor 21.

In operating the apparatus the load sliders may be applied successively starting from either end of the divider bar. If the first load slider nearest the left hand support is selected it is moved along the resistance bar to the point of application of the load. When the slider is thus located, switch 17 is closed to the left (to make the current flow upward or into the divider bar) or to the right (to make the current flow downward or from the divider bar), depending upon whether the load is up or down. Key 20, which is a self-returning key, is then held down so as to include in the line an ammeter L, which has one terminal connected to point X and another terminal 22 as a contact for key 20. While key 20 is held down with the ammeter in circuit, the load-regulating rheostat 16 is adjusted until the ammeter L reads the load—ammeter L having been previously calibrated in the manner hereinafter described to read directly in pounds. When the proper amount of current is flowing through the load circuit, key 20 is released from engagement with contact 22 and engages contact 23, thereby cutting the ammeter L out of circuit and introducing into the circuit the load ammeter compensating resistor 19. This resistor compensates for the ammeter and related wiring so that the electrical character of the load circuit will remain unchanged and the adjusted current will continue to flow through the load circuit and into the divider bar.

The second load slider 11 is then adjusted in position to correspond with the position of the second load from the left, and the second load circuit 14 is adjusted in a manner similar to that described for adjusting load circuit 13 so that current will flow through load circuit 14 in an amount and direction corresponding to the load on the structural element at the point of load application corresponding to the position of the load slider 11.

With the loads adjusted and currents flowing in load circuits 13 and 14, the next slider 12 to the right is brought into a position corresponding with the third load from the left end of the messenger wire and the procedure outlined for adjusting load circuits 13 and 14 is followed for impressing upon circuit 15 the current representing the physical load for the selected position of slider 12. There will be as many load sliders and electrical paths brought into position and adjusted in succession working to the right as there are loads upon the messenger wire. After all of the load representing currents have been adjusted, the vertical reactions at the ends of the messenger wire may be read from ammeter R1 and ammeter R2, which are calibrated directly in pounds, and show respectively the true vertical reactions at the points of suspension of the messenger wire. Of course, ammeters R1, R2 and L may be read directly in electrical units and later converted into any desired units of force, and the same is so as to other measuring instruments, but the direct reading of an instrument with a calibrated scale is of considerable help.

Figure 1:
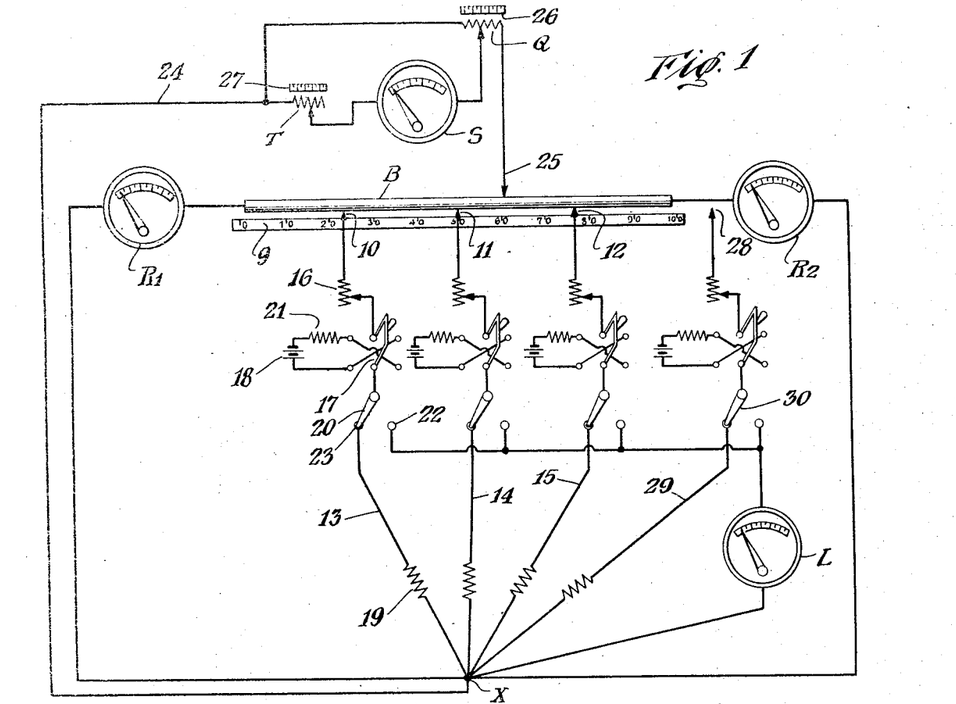
Fig. 1 is a circuit diagram showing one method of applying the invention.

*Use of voltmeter circuit.*—With the remaining circuits shown in Fig. 1 it is possible to determine, in one case, sag at different load points when the span and tension of a flexible member are known, and, in another case, the tension when the sag and span of a flexible member are known. These two cases occur in the design and installation of a longitudinal catenary and a cross catenary, respectively. It is apparent that it is also possible to determine the span for a known tension and sag but this calculation would be infrequent and not concerned with the longitudinal catenary and cross catenary problems under consideration.

The operation of the circuit for determining the tension and sag is based upon the theory that the voltage drop from one end of the divider bar B to any point on the bar when the network is loaded is proportional to the sag of a flexible structural element at a point thereon corresponding to the point on the divider bar from which the voltage is measured.

Having reference to Fig. 1, the voltmeter circuit 24 has a connection to the load circuits at point X and another connection or tap in the nature of a slider 25, adapted to be adjustably positioned anywhere along the length of the divider bar. The voltmeter circuit includes a voltmeter S which is calibrated to read directly in feet, a potentiometer Q by which adjustment may be made for the length of the span, and a resistance T calibrated in pounds and adapted to insert a multiplier factor to the reading of the voltmeter S as determined by different tensions. The potentiometer is provided with a span scale 26 calibrated in feet. The multiplier is provided with a tension scale 27 calibrated in pounds.

In all cases, before the voltmeter circuit is utilized the network must be loaded and all of the load circuits energized with currents representing the values of the loads on a structural element at the different points of load concentration as indicated by the position of the various load sliders.

*A. Longitudinal catenary.*—For longitudinal catenary computations, the multiplier T is set for the known horizontal tension at the points of suspension of a flexible member. The potentiometer Q is then set for the known span length. With these two instruments set, the sag slider 25 is moved along divider bar B to any point where it is desired to determine the sag. The sag of a flexible member at any point may be read upon the voltmeter S by locating the sag slider upon the divider bar at the point corresponding to the particular point upon the flexible member where the sag is desired to be determined. The point of maximum sag may be located by moving the sag slider until meter S shows its maximum reading.

*B. Cross catenary.*—For cross catenary computations the potentiometer Q is set for span and the sag slider is then moved to the location giving maximum reading of meter S. With the sag slider at the position of maximum reading, the tension rheostat T is adjusted until meter S reads the sag of the flexible element which is to be obtained. Tension rheostat T will now read a horizontal component of the required tension at the points of suspension of the flexible member for the desired sag as indicated by the voltmeter, and for determining the sag at any point the sag slider may now be moved to the point on the divider bar corresponding to the location at which the sag is desired to be known. Voltmeter S will read the sag at the point selected.

*C. Load transfer between two messengers.*—Another special computation which may be solved with the present invention is concerned with the loading of intersecting flexible elements so as to give them the same height at the point of intersection.

If two measuring apparatuses similar to that illustrated in Fig. 1 are set up as described, one for one messenger and the other for another messenger, then the solution for an intersection between the two messengers may be easily made as follows:

The sag sliders 25 of each of the apparatuses are then moved to the crossing location of the messengers. After noting which messenger is above the other by comparing readings of the voltmeters S in the two apparatuses, a previously unused load slider 28 in each apparatus is adjusted to the crossing location. Then the switches 17 for these particular load sliders 28 are closed to correspond with the direction of the load in each instance; hence, the current will be down for the highest messenger, and up for the lowest messenger. At the point of intersection of the two messengers the sag should be the same and in order to adjust the circuits in the two apparatuses so as to obtain the same sag reading at the point of intersection, key 30 of the load slider circuit 29 on each apparatus (corresponding to the point of crossing) is kept down while the current and hence the load indicated by each meter L is gradually increased, keeping the reading on each of the two meters L the same at each instant until meter S on each apparatus shows the same sag. When the meter S in each apparatus shows the same sag, the load transfer between the two messengers has been made and the ammeters $R_1$ and $R_2$ on each apparatus will now read the vertical reactions corrected for load transfer. With this condition in the two apparatuses, the sag slider 25 on either or both apparatuses can now be moved to any point for determining the sag at such point corrected for load transfer.

The foregoing is given as one example of special use of the measuring circuits of the present invention. While many other solutions may be obtained on this apparatus, such as ascertaining effects resulting from changes of value or location of any load, or the determination of the bending moment at any point by setting multiplier T on unity tension, it is believed that the foregoing will suffice to explain the principle of the invention and to advise those skilled in various computations involving applied mechanics how to apply the invention to other uses.

Theory

Figure 2:
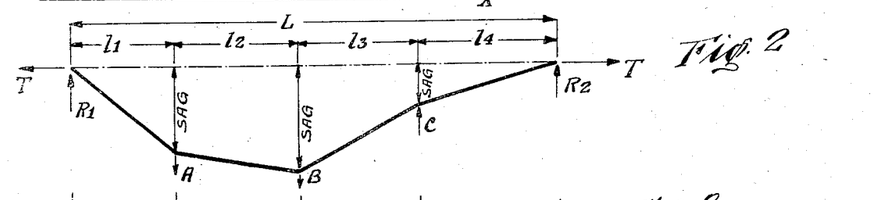
Fig. 2 is a diagram of a loaded flexible element.

The theory of the operation of the apparatus of the present invention may be made clear from a mathematical determination of the effects of spaced applied loads upon a structural element by the application of electrical laws to an electrical network functioning as an apparatus set up for computing effects upon the particular loaded structural element. The development of this proof is to be considered in conjunction with Figs. 2, 3 and 4, which show a loaded flexible member suspended at its ends, a shear diagram for the loaded flexible member, a resistance element or divider bar representing the length of the span of the flexible member and load current circuit taps representing the actual points of application of loads A, B and C appearing in Fig. 2. By the use of principles of applied mechanics the various effects such as the vertical reactions ($R_1$, $R_2$) at the points of suspension, values of shear and values of sag may be found to be as follows (all linear measurements being in feet and all force or load values being in pounds):

$$\text{Sag at } A = \frac{[A(l_2+l_3+l_4)+B(l_3+l_4)-Cl_4]l_1}{TL}$$

$$\text{Sag at } B = \frac{[A(l_2+l_3+l_4)+B(l_3+l_4)-Cl_4]l_1+[B(l_3+l_4)-Cl_4-Al_1]l_2}{TL}$$

$$\text{Sag at } C = \frac{[B(l_1+l_2)+A(l_1)-C(l_1+l_2+l_3)]l_4}{TL}$$

$$R_1 = \frac{[A(l_2+l_3+l_4)+B(l_3+l_4)-Cl_4]}{L}$$

$$R_2 = \frac{B(l_1+l_2)+A(l_1)-C(l_1+l_2+l_3)}{L}$$

Figure 3:
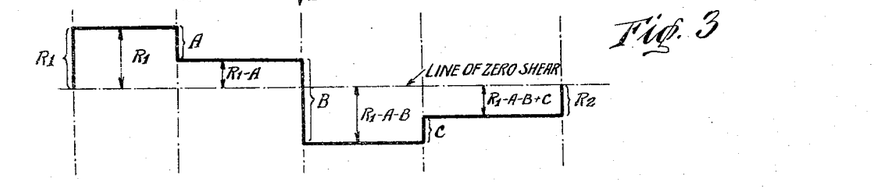
Fig. 3 is a shear diagram for the flexible element of Fig. 2.

The five shear values starting at the left hand point of suspension are as follows:

$$R_1 = \frac{[A(l_2+l_3+l_4)+B(l_3+l_4)-Cl_4]}{L}$$

$$R_1-A = \frac{[B(l_3+l_4)-Cl_4-Al_1]}{L}$$

$$R_1-A-B = -\frac{[Al_1+B(l_1+l_2)+Cl_4]}{L}$$

$$R_1-A-B+C = -\frac{[Al_1+B(l_1+l_2)-C(l_1+l_2+l_3)]}{L}$$

$$R_2 = -\frac{[Al_1+B(l_1+l_2)-C(l_1+l_2+l_3)]}{L}$$

Solution by the electrical method

Figure 4:
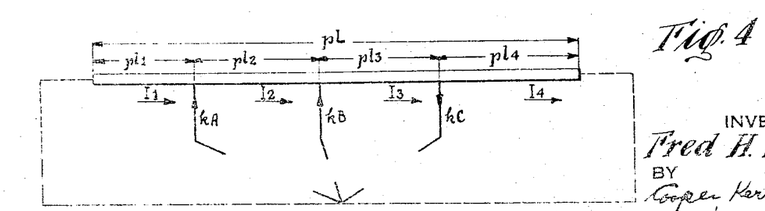
Fig. 4 is a current flow diagram used in conjunction with the explanation of the theory of the network contained in the accompanying description of the invention.

Having reference to Fig. 4, the values appearing thereon and denoted as A, B, C, L, $l_1$, $l_2$, $l_3$, and $l_4$ are the same as given for Figs. 2 and 3 and related values given above. The values $l_1$, $l_2$, $l_3$ and $l_4$ are multiplied by $p$ to reduce the size of the resistance bar to any scale, and A, B, C, are multiplied by constant $k$ so that any value of current may be used to represent each pound.

Let $I_1$=current in $pl_1$[=current in $R_1$ meter, Fig. 1,]
$I_2$=current in $pl_2$
$I_3$=current in $pl_3$
$I_4$=current in $pl_4$[=current in $R_2$ meter, Fig. 1].

Assuming all currents flowing toward the right and as plus (+), and since current flowing toward a point equals current flowing away from that point, the following equations may be written:

[1] $\qquad I_1+kA=I_2$
[2] $\qquad I_2+kB=I_3$
[3] $\qquad I_3=kC+I_4$

Summation of voltage drops around any closed circuit equals zero.

$$I_1pl_1w+I_2pl_2w+I_3pl_3w+I_4pl_4w=0$$

[where $w$=ohms/ft.]

[4] $\qquad I_1l_1+I_2l_2+I_3l_3+I_4l_4=0$

Therefore since a solution of the above four equations will give the distribution of the current in the resistance bar, it makes no difference in their distribution what the actual length of bar or its ohms per foot are.

Solution of above 4 equations:

(1) $\qquad I_1+kA=I_2$
(2) $\qquad \underline{-I_3+kB=-I_2}$
[5] $\qquad I_1-I_3+k(A+B)=0 \qquad (1)+(2)$ (4) $\quad I_1l_1+I_2l_2+I_3l_3+I_4l_4=0$
$\qquad \underline{-kCl_4+I_3l_4-I_4l_4=0}$ Equation [3]$\times l_4$

[6] $\quad I_1l_1+I_2l_2+(l_3+l_4)(I_3)-kCl_4=0$ By addition $$(2) \quad I_1 + kA = I_2$$
$$(2) \quad -I_3 + kB = -I_2$$

[7] $\quad I_1 + I_2 + k(A-B) - 2I_2 = 0 \quad (1)-(2)$ $$2I_1 I_1 + 2I_2 I_2 + 2I_3(I_3 + I_4) - 2kCI_4 = 0 \quad \text{Equation } [6] \times 2$$
$$I_1 I_2 - 2I_2 I_2 + I_3 I_2 + k(A-B)I_2 = 0 \quad \text{Equation } [7] \times I_2$$

[8] $\quad I_1(2I_1 + I_2) + I_3(2I_3 + 2I_4 + I_2) - 2kCI_4 + k(A-B)I_2 = 0 \quad$ By addition $$I_1(2I_1 + I_2) - I_3(2I_1 + I_2) + k(A+B)(2I_1 + I_2) = 0 \quad \text{Equation } [5] \times (2I_1 + I_2)$$

[8] $\quad \underline{I_1(2I_1 + I_2) + I_3(2I_3 + 2I_4 + I_2) - 2kCI_4 + k(A-B)I_2 = 0}$
$$+2I_3(I_1 + I_2 + I_3 + I_4) = +k(A+B)(2I_1 + I_2) + 2kCI_4 - k(A-B)(I_2)$$
By subtraction $$2I_3 L = 2k[AI_1 + B(I_1 + I_2) + CI_4]$$

[9] $\quad I_3 = +\dfrac{k}{L}[AI_1 + B(I_1 + I_2) + CI_4]$

Substituting value of $I_3$ (Equation 9) in Equation 2.

$$I_2 + kB = \dfrac{k}{L}[AI_1 + B(I_1 + I_2) + CI_4]$$
$$I_2 = \dfrac{k}{L}[AI_1 + BI_1 + BI_2 + CI_4 - BI_1 - BI_2 - BI_3 - BI_4]$$

[10] $\quad I_2 = -\dfrac{k}{L}[B(I_3 + I_4) - CI_4 - AI_1]$

Substituting value of $I_3$ (Equation 9) in Equation 3.

$$\dfrac{k}{L}[AI_1 + B(I_1 + I_2) + CI_4] = kC + I_4$$
$$I_4 = \dfrac{k}{L}[AI_1 + BI_1 + BI_2 - CI_1 - CI_2 - CI_3 - CI_4 + CI_4]$$

[11] $\quad I_4 = +\dfrac{k}{L}[AI_1 + B(I_1 + I_2) - C(I_1 + I_2 + I_3)]$

Substituting value of $I_2$ (Equation 10) in Equation 1.

$$I_1 + kA = -\dfrac{k}{L}[B(I_3 + I_4) - CI_4 - AI_1]$$
$$I_1 = -\dfrac{k}{L}[BI_3 + BI_4 - CI_4 - AI_1 + AI_1 + AI_2 + AI_3 + AI_4]$$

[12] $\quad I_1 = -\dfrac{k}{L}[A(I_2 + I_3 + I_4) + B(I_3 + I_4) - CI_4]$

*Conclusion.*—By comparing the currents in the resistance bar ($I_1$, $I_2$, $I_3$ and $I_4$) as given in Equations [9], [10], [11] and [12] with the shears in the span as given above, it will be apparent that current anywhere in the resistance bar $= k$ times shear in corresponding point in span. Also, since $I_1$=current in ammeter $R_1$ and $I_4$=current in ammeter $R_2$, and if ammeters $R_1$, $R_2$ and L are calibrated alike, then meters $R_1$ and $R_2$ will read the reactions $R_1$ and $R_2$ directly in pounds. (Note that plus or minus signs (+ or −) of $I_1$, $I_2$ etc. are not the same as that of the shears but are all different. The signs would agree if the currents had been assumed in the opposite direction at the start. The important thing to note is that the sign changes for $I$ at the same point as the shear).

*Computation for sag.*—Assume a voltmeter be connected from left end of resistance bar, Fig. 4, to point of application of $kA$, then volts=current times resistance
volts=$[I_1][wpl_1]$ Substituting $I_1$ of Equation [12]

[13] volts=
$$-(wpk)\left(\dfrac{l_1}{L}\right)[A(I_2 + I_3 + I_4) + B(I_3 + I_4) - CI_4]$$

Similarly voltage from left end of bar to $kB$
volts=$[I_1][wpl_1]$ + (algebraic) $[I_2][wpl_2]$

[14] volts=$-\dfrac{wpk}{L}(l_1[A(I_2 + I_3 + I_4) + B(I_3 + I_4) - CI_4] + l_2[B(I_3 + I_4) - CI_4 - AI_1])$ Similarly voltage from left end of bar to $kC$
volts=$[I_1][wpl_1] + [I_2][wpl_2] + [I_3][wpl_3]$
or volts=$wp[I_1 l_1 + I_2 l_2 + I_3 l_3]$ but from Equation [4]
$$I_1 l_1 + I_2 l_2 + I_3 l_3 = -I_4 l_4$$
thus
volts=$-wp\, I_4 l_4$ Substituting $I_4$ from Equation [11]

[15] volts=$-\dfrac{wpk}{L}(l_4[AI_1 + B(I_1 + I_2) - C(I_1 + I_2 + I_3)])$

*Conclusion.*—By comparing the voltages as given by Equations [13], [14] and [15] with the sags at the points of application of loads A, B and C, respectively, it is apparent that the total sag at a given point $$= \dfrac{1}{wpkT}$$

times voltage drop from end of rod to that point. The design constant $$\dfrac{1}{wk}$$

is constant for any problem on a given network and it is taken care of in the original calibration of the voltmeter in feet. The constants $$\dfrac{1}{T} \text{ and } \dfrac{1}{p}$$

are constant throughout a given problem but may be different for other problems. Thus these constants are taken care of by voltmeter multiplier (calibrate multiplier in terms of "T") and by span rheostat (calibrate in feet span).

*Measuring instruments and calibration*

The calibration of the various meters and resistances may be described briefly as follows: A choice is made as to the number of pounds per ampere for which the apparatus is to be designed. When this constant has been chosen and the probable range of loads and vertical reactions in pounds for a given application of the circuit has been selected, then the ampere range of ammeters $R_1$, $R_2$ and L are thereby fixed and their scale calibration in pounds is fixed by the original pounds per ampere. For example, suppose the apparatus is to be applied for the solution of a wire strung under tension between two supports and subjected to various vertical loads at various points between the supports. Assume maximum conditions and that the maximum expected load is say 600 lbs. and the maximum vertical reaction at the supports is say 1200 lbs. ($R_1$ or $R_2$). Depending on the source of power and various other design factors, it may be assumed that a design constant of 2400 lbs. per ampere is finally selected. Ammeter $R_1$ or $R_2$ will then be a 0.5 ammeter, the maximum or 0.5 ampere reading on the scale will be labeled 1200 lbs. and the scale will be calibrated uniformly from zero to 1200 lbs. The load current ammeter L from the same reasoning will be a 0.25 ammeter, the maximum or 0.25 ampere reading will be labeled 600 lbs. and the scale calibrated uniformly from zero to 600 lbs.

The voltmeter S is calibrated by means of a general theoretical mathematical solution of the network by electrical laws which produces the calibration constant, $$\frac{1}{wpkT}$$

as hereinbefore explained. The total sag or deflection at a given point is equal to $$\frac{1}{wpkT}$$

times the voltage drop from the end of the resistance tube to that point. In this equation $$w = \frac{\text{total ohms in resistance bar ``B''}}{\text{length of bar ``B'' in feet}}$$

$$p = \frac{\text{length of bar ``B'' in feet}}{\text{maximum expected length between actual supports in feet}}$$

$$k = \frac{1}{\text{pounds per ampere}}$$

and T=minimum horizontal tension expected (in lbs.).

If the maximum sag which is likely to be calculated is assumed, the maximum voltage reading of the voltmeter S is determined and the full scale deflection of the voltmeter is labeled with the maximum sag in feet, the scale being calibrated uniformly from zero to said maximum sag.

If the apparatus were to be used for computations involving the same span, there would not be any need of a potentiometer in the voltmeter circuit. Without the potentiometer, or with the use of a non-variable potentiometer, the voltmeter S will read correctly the deflection for one tension (minimum) and one span (maximum), hereinafter called the "natural" reading. In order to enlarge the field of use of the apparatus (Fig. 1) it is necessary to reduce the "natural" reading of the voltmeter for shorter spans, and this is done by adjusting the potentiometer Q, which is calibrated from zero to "natural" maximum span according to the theory that for flexible members loaded with concentrated loads the sag varies directly as the span. This impresses on voltmeter S the proper proportion of the total potentiometer drop, depending on the span. Also, the "natural" reading of the voltmeter must be reduced for tensions greater than the "natural" minimum tension, and this is done by means of the voltmeter multiplier rheostat T, which is calibrated directly in pounds tension according to the theory that sag varies inversely as tension.

Figure 5:
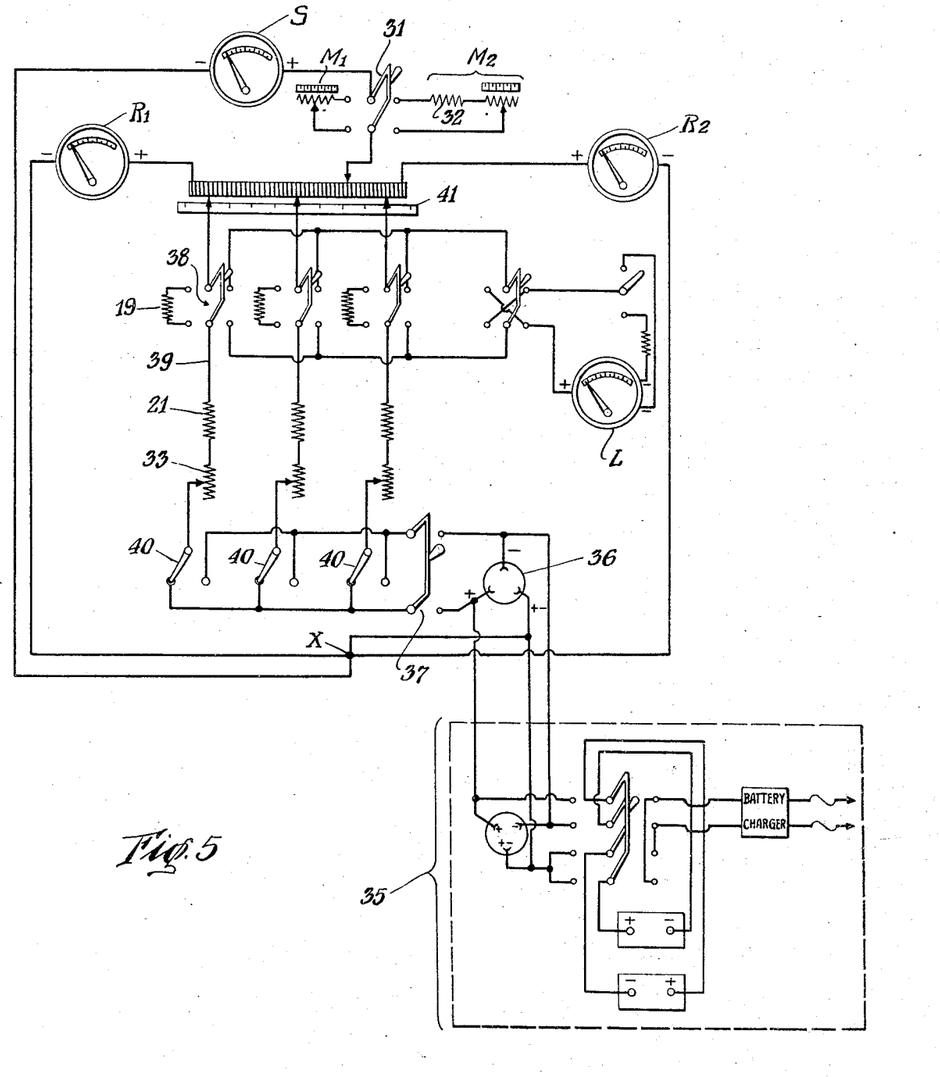
Fig. 5 shows another embodiment of the invention.

It is to be noted that the adjustments to accommodate different tensions and different spans may be applied by other arrangements and in other ways for correctly reducing the "natural" sag or deflection reading of the voltmeter within the scope and usefulness of the present invention. For example, another mode of embodying the principle of the invention is illustrated in Fig. 5, wherein the multiplier T and the span potentiometer Q of Fig. 1 are combined into one resistor ($M_1$ or $M_2$) in series with the voltmeter. These resistors are calibrated in terms of a constant which is equal to tension divided by span. The double pole double throw switch 31 prevents the position of the slider on resistor $M_1$ from affecting the calibration of $M_2$ and vice versa. By providing separate resistors $M_1$ and $M_2$, rather than a single resistor, it is possible to expand the scale for a wide range of values of the constant with the use of standard resistors of reasonable size. Resistor $M_2$ includes a resistor 32 which is equivalent to resistor $M_1$. For the apparatus illustrated in Fig. 5, and for use with instruments and resistors whose specifications are given herein, the resistor $M_1$ would be so chosen that its scale would provide a reading varying from 6 to 30, and resistor $M_2$ would be such that its scale would provide a reading varying from 30 to 60.

The divider bar or resistance element has been variously designated herein and it is to be understood that this element is intended to constitute any element capable of use in a system employing the present invention for opposing flow of direct current or alternating current. It may take the form of a bar of such material as nichrome or it may take the form of an ordinary coil of resistance wire mounted upon a tube. The selection of the form or material of the resistance element is dependent upon various factors including the characteristics of the available current, sizes of meters, heating losses, etc. A noninductive resistance will, of course, enable a more rapid use of the apparatus because of the relatively short time required for obtaining stability of current flow. In Fig. 1, I have illustrated an ordinary bar or rod as the resistance element, and in Fig. 5, I have illustrated a coil of wire uniformly wound upon a porcelain tube rigidly mounted at its ends. With the constants given herein, the total resistance of the winding upon the tube is calculated to be 5.915 ohms, and this may be obtained by winding 448 turns of No. 15 "Advance" resistance wire (294 ohms/mil. ft. at 20° C.) upon a tube having an outside diameter of one-half inch.

Other suitable instruments and devices include the following.

Sag voltmeter S, Westinghouse type LX millivoltmeter with a full scale reading of 125 millivolts. Terminal resistance of 150 ohms.

The reaction ammeters $R_1$ and $R_2$, Westinghouse type LX ammeter with full scale reading 0.5 amperes. A 25 millivolt shunt is to be provided so that combined resistance of ammeter and shunt is 0.050 ohm.

Load meter L, Westinghouse type LX ammeter equipped with three connection studs for two scales, full scale deflection to be either 25 milliamperes or 250 milliamperes. Resistance for both scales to be 4 ohms.

Tension-over-span rheostat $M_1$, Ward-Leonard 4 inch vitrohm ring type, total resistance to be variable from 0 to 590 ohms.

Tension-over-span rheostat, Ward-Leonard 4 inch vitrohm ring type resistance variable from 0 to 760 ohms (part of $M_2$).

Tension-over-span resistor (32), Ward-Leonard type 1¾", resistance equal to 550 ohms as exactly as possible.

Load-regulating rheostat (33), Ward-Leonard 3 inch vitrohm ring type, range from 0 to 1500 ohms—100 watt rating.

Protective resistors (21), Ward-Leonard type 1¾ inch, 18 ohms.

Ammeter compensating resistors (19), Ward-Leonard type 1¾", resistance of 4 ohms.

Two storage batteries, each Exide 3 cells, Type LXG9, 80 ampere-hours.

In the network shown in Fig. 5, one battery or source of current supply is used for all regulating rheostat circuits in contradistinction to the separate sources of power provided in the network illustrated in Fig. 1. The battery or other source of current supply should be such that the terminal voltage shall remain practically constant from the load of one slider to the combined loads of all slides with which the apparatus is equipped. For ordinary railroad work each apparatus should be equipped with fifteen sliders from which the number needed for the solution of a particular problem may be selected. The source of current supply and the polarity control devices are indicated generally at 35, Fig. 5, and the current is taken therefrom to a three-polarity plug or receptacle 36.

A double pole single throw switch 37 is provided for applying power to the computor and individual switches 38 are provided to insert the load ammeter in any load circuit 39. Switches 40 enable selective energization of the load-regulating rheostat circuits 39. These and other variations which are more suited to the practical embodiment of the invention, are design features which may be used without departing from the principle of the invention.

It should be observed that the ammeter $R_1$ (or $R_2$) is included in the circuit whose potential drop is to be measured by the voltmeter S. Both the ammeters $R_1$ and $R_2$ and the wiring from each of the actual ends of the divider bar to point X should be of zero resistance for ideal conditions. Since this is impossible, it is necessary to consider the circuit from each actual end of the divider bar to the point X as being an extension of the ends of the divider bar as far as the proper division of any given load current is concerned. Thus, the "effective" length and resistance of the divider bar is slightly greater than its actual resistance and length and this is taken care of in the design of the apparatus by having the zero and 100% points on the fixed scale (9 and 41) come beyond the corresponding ends of the actual divider bar, i. e., the zero and 100% points come with respect to the divider bar at the "effective" ends of the divider bar. It may be possible to make a design in which the resistance of the ammeters and wiring as described would be negligible as to its effects in lengthening the actual resistance bar. However, to be theoretically correct, the ammeters should be considered as described above.

What is claimed is:

1. Apparatus for determining the structural loading effects of forces acting upon a structural element, comprising an electrical network of conducting circuits, current supply means for energizing said network, said network including a resistance element corresponding to the structural element, said network having electrical paths having connection with said resistance element at points corresponding to the points of application of forces acting upon the structural element and joined at a terminal of the same polarity as the ends of the resistance element, a line having connection with said terminal and a tap for engagement with said resistance element, and a voltmeter in said line for measuring the potential drop in the resistance element at the point of connection of said line with said resistance element.

2. Apparatus for determining the structural loading effects of forces acting upon a structural element, comprising an electrical network of conducting circuits, said network having a resistance element therein which corresponds to the structural element, means including one or more selected circuits connected to said resistance element at points corresponding to the points of application of the forces acting on the structural element, a load-regulating rheostat in each circuit to control the current intensity corresponding to the value of the forces acting upon the structural element, and electrical measuring instrument means in said network for measuring the value of the current in the conducting circuit at either end of the resistance element for determining the values of shear resulting from the application of the said forces upon the structural element.

3. Apparatus for determining the structural loading effects of forces acting upon a structural element, comprising an electrical network of conducting circuits said network having a resistance element therein which corresponds to the structural element, means including one or more selected circuits connected to said resistance element at points corresponding to the points of application of the forces acting on the structural element, a load-regulating rheostat in each circuit to control the current intensity corresponding to the value of the forces acting upon the structural element, and means for determining the voltage drop between said first named means and any point along the resistance element for determining a measure of deflection of the structural element under the forces acting thereon.

4. Apparatus for determining the structural loading effects of forces acting upon a structural element, comprising an electrical network of conducting circuits, said network having a resistance element therein which corresponds to the structural element, means including one or more selected circuits connected to said resistance element at points corresponding to the points of application of forces acting on the structural element, a load-regulating rheostat in each circuit to control the current intensity corresponding to the value of the forces acting upon the structural element, and a line having a connection with said conducting circuits and an adjustable connection with the resistance element, said line including a voltmeter and a resistance by which the horizontal component of the reaction force at the end of the structural element may be determined.

5. Apparatus for determining the structural loading effects of forces acting upon a structural element, comprising an electrical network of conducting circuits, said network having a resistance element therein which corresponds to the structural element, means including one or more selected circuits connected to said resistance element at points corresponding to the points of application of forces acting on the structural element, a load-regulating rheostat in each circuit to control the current intensity corresponding to the value of the forces acting upon the structural element, and a line having a connection with said conducting circuits and an adjustable connection with the resistance element, said line including a voltmeter and a resistance, the resistance being calibrated in reference to the linear measure of the length of span of the structural element.

6. In apparatus for determining effects of spaced applied structural loads upon a structural element, the combination comprising a resistance device representing a loaded structural element, a plurality of adjustable taps electrically engaging said resistance device at points representing the location of structural loads upon said structural element, means for connecting said adjustable taps to a common junction with the two ends of said resistance device, said means including a source of current and means for regulating the current through said taps proportionate to the corresponding magnitude of the structural loads, and electrical measuring means for determining the current magnitude at each end of said resistance device, said current magnitude being proportional to the magnitude of the shear force effects at the ends of said represented structural element, said electrical measuring means being connected between the said ends of said resistance device and said common junction.

7. In apparatus for determining effects of spaced applied structural loads upon a structural element, the combination comprising a resistance device representing a loaded structural element, a plurality of adjustable taps electrically engaging said resistance device at points representing the location of structural loads upon said structural element, means for connecting said adjustable taps to a common junction with the two ends of said resistance device, said means including a current supply and means for regulating the current through said taps proportionate to the corresponding magnitude of the structural loads, and electrical measuring means for determining the potential from the said common junction to any selected point on the said resistance device, said potential being proportional to the structural bending moment in the said represented structural element, said electrical measuring means being connected between the said common junction and selected point on the resistance device.

8. In apparatus for determining effects of spaced applied structural loads upon a structural element, the combination comprising a resistance device representing a loaded structural element, a plurality of adjustable taps electrically engaging said resistance device at points representing the location of structural loads upon said structural element, means for connecting said adjustable taps to a common junction with the two ends of said resistance device, said means including a current supply and means for regulating the current proportionate to the corresponding magnitude of the structural loads, electrical measuring means for determining the potential from said common junction to any selected point on said resistance device, said electrical measuring means being connected between the said common junction and selected point on the resistance device, and means for electrically dividing the said potential so that the said electrical measuring means will indicate a portion of said potential, said portion being proportional to the structural deflection of the said represented structural element at the location thereon corresponding with the said selected point on said resistance device.

9. Apparatus for determining effects of spaced applied structural loads upon a structural element comprising, in combination, an electrical network including a device representing the structural element and a plurality of adjustable taps electrically engaging said device at spaced points representing the points of application of force to the structural element, means for connecting each of said taps to a common junction, said means including a current supply and an adjustable resistance therein to control current intensity in proportion to the magnitude of the force, and a voltage-responsive instrument adjustably connected to said device and to said common junction and calibrated to indicate the desired structural load effects.

10. Apparatus for determining effects of spaced applied structural loads upon a structural element comprising, in combination, an electrical network including a plurality of parallel paths connected together at a common junction and a resistance element to which said paths are adjustably connected, each of said parallel paths including means for supplying a structural load-representing current thereto, and an electrical measuring instrument connected to said network between said common junction and said resistance element and calibrated to indicate structural load effects.

11. Apparatus for determining effects of spaced applied structural loads upon a structural element comprising in combination, an electrical network including a device representing the structural element and a plurality of adjustable taps electrically engaging said device at spaced points corresponding to the places of application of force to the structural element and means for connecting each of said taps to a common junction, said means including a current supply and a variable resistance and a current responsive instrument connected to said common junction and to said device in said network for indicating the desired effects.

12. Apparatus for determining effects of spaced applied structural loads upon a structural element comprising, in combination, an electrical network including an electrical resistance representing a structural element and a plurality of electrical paths adapted for selective connection to said resistance element at points corresponding to positions of structural loads on the structural element, the ends of said electrical paths remote from said resistance element being electrically connected at the same polarity, said paths including means for controlling the flow of current through each of the paths so as to obtain intensity of current flow in each of said paths in proportion to the structural load for which each particular path is representative, measuring instruments in said network for measuring currents at the ends of the resistance, said measuring instruments being connected between said ends of the electrical paths which are at the same polarity and the ends of said resistance, and a voltage responsive instrument connected to all of said electrical paths and to said resistance for measuring the desired effects.

13. Apparatus for determining the sag of a flexible element which is loaded with a plurality of concentrated loads comprising, in combination, an electrical network including a plurality of current paths and a resistance representing the flexible member and to which the paths are connected, said current paths being joined at one end and tapped to the resistance at each of their respective other ends at points corresponding to the points of application of the concentrated loads, means for supplying current to each of said current paths, said paths including means for controlling the current flow in said paths so as to obtain intensity of current flow in each of said paths in proportion to the load upon the flexible member which each path represents, and a voltage responsive meter for determining the potential drop between a selected point intermediate the ends of the resistance and one end of the resistance.

14. Apparatus for determining the effects of spaced applied structural loads upon a structural element, comprising conducting paths and a resistance element which corresponds in length to the distance between end supports of the structural element, one end of each path being electrically connected at the same polarity with like ends of all of said paths and the other ends of said paths being connected to said resistance element, means for applying current to said resistance element through paths intersecting it at various points which relatively correspond to the loading points of the related structural element, and electrical measuring instrument means for measuring electrical characteristics of current flow though another path to thereby obtain measurements of the loading effects of the structural element at a point corresponding to the said other path in which the electrical characteristics are being determined.

15. Apparatus for determining the structural loading effects of forces acting upon a structural element, comprising an electrical network of conducting circuits, said network including a resistance element corresponding in length to the distance between end supports of the structural element, said network having electrical paths having connection with said resistance element at points corresponding to the points of application of the forces acting upon the structural element, each of said electrical paths being also connected at a common junction in said network which is equidistant electrically from each end of said resistance element and means for determining the strength of current flowing through the several paths.

FRED H. HEDIN.